US010632667B2

(12) United States Patent
Grande et al.

(10) Patent No.: US 10,632,667 B2
(45) Date of Patent: Apr. 28, 2020

(54) MANUFACTURING PROCEDURE FOR CEILING TRIMS FOR VEHICLES

(71) Applicant: GRUPO ANTOLÍN-INGENIERÍA, S. A., Burgos (ES)

(72) Inventors: Miguel Ángel Grande, Burgos (ES); Javier Merino, Burgos (ES); José Ignacio Palomino, Burgos (ES); Fernando Salazar, Burgos (ES)

(73) Assignee: GRUPO ANTOLÍN-INGENIERÍA, S. A., Burgos (ES)

( * ) Notice: Subject to any disclaimer, the term of this patent is extended or adjusted under 35 U.S.C. 154(b) by 120 days.

(21) Appl. No.: 15/596,114

(22) Filed: May 16, 2017

(65) Prior Publication Data
US 2017/0334102 A1 Nov. 23, 2017

(30) Foreign Application Priority Data
May 17, 2016 (EP) .................................... 16382215

(51) Int. Cl.
*B29C 51/14* (2006.01)
*B29C 51/42* (2006.01)
(Continued)

(52) U.S. Cl.
CPC ............ *B29C 51/14* (2013.01); *B29C 39/123* (2013.01); *B29C 39/26* (2013.01); *B29C 39/38* (2013.01);
(Continued)

(58) Field of Classification Search
CPC ....... B29C 39/123; B29C 39/38; B29C 39/26; B29C 43/203; B29C 43/206;
(Continued)

(56) References Cited

U.S. PATENT DOCUMENTS 3,446,685 A * 5/1969 Neumann ............... B29C 43/00
156/219
4,225,627 A * 9/1980 Moore .................. A23G 3/0284
264/335
(Continued)

FOREIGN PATENT DOCUMENTS

WO  WO 01/10637  * 2/2001  ............... B32B 9/02
WO  2012/031190 A1  3/2012
(Continued)

OTHER PUBLICATIONS

Nov. 18, 2016—(EP) Extended Search Report—App 16382215.8.

*Primary Examiner* — Anthony Calandra
*Assistant Examiner* — Eric T Chen
(74) *Attorney, Agent, or Firm* — Banner & Witcoff, Ltd.

(57) ABSTRACT

A manufacturing procedure for ceiling trims for vehicles. The ceiling trims comprise at least one first coating sheet and at least one second coating sheet that extend along one of the sides of the first sheet, joined via a layer of heat-stable polyurethane adhesive, comprising a step of applying a gas-phase catalyst on such sheets through a thermoforming mould that starts before the mould is completely closed and ends before the mould is completely opened. As a result of the application of a gas-phase catalyst we prevent the use of demoulding agents to facilitate extraction of the ceiling trim formed inside the mould.

6 Claims, 4 Drawing Sheets

(51) Int. Cl.

| | | |
|---|---|---|
| *B29C 39/12* | (2006.01) | |
| *B32B 37/12* | (2006.01) | |
| *B32B 38/18* | (2006.01) | |
| *B29C 39/26* | (2006.01) | |
| *B29C 39/38* | (2006.01) | |
| *B60R 13/02* | (2006.01) | |
| *B29L 9/00* | (2006.01) | |
| *B29C 51/08* | (2006.01) | |
| *B29K 105/00* | (2006.01) | |
| *B32B 38/16* | (2006.01) | |
| *B29K 101/10* | (2006.01) | |
| *B29K 475/00* | (2006.01) | |
| *B29L 31/30* | (2006.01) | |

(52) U.S. Cl.
CPC ........ *B29C 51/424* (2013.01); *B32B 37/1207* (2013.01); *B32B 38/1866* (2013.01); *B60R 13/0212* (2013.01); *B29C 51/082* (2013.01); *B29K 2101/10* (2013.01); *B29K 2105/0014* (2013.01); *B29K 2105/0097* (2013.01); *B29K 2475/00* (2013.01); *B29L 2009/001* (2013.01); *B29L 2031/3041* (2013.01); *B32B 2037/1253* (2013.01); *B32B 2038/166* (2013.01); *B32B 2309/02* (2013.01); *B32B 2605/003* (2013.01)

(58) Field of Classification Search
CPC ..... B29C 33/048; B29C 35/049; B29C 51/00; B29C 51/14; B29C 51/264; B29C 51/422–428; B32B 37/12
See application file for complete search history.

(56) References Cited

U.S. PATENT DOCUMENTS

| | | | | |
|---|---|---|---|---|
| 4,526,831 | A * | 7/1985 | Hatchadoorian | B29C 43/203 428/300.7 |
| 5,087,311 | A * | 2/1992 | Elliott | B29C 66/729 156/212 |
| 5,108,691 | A * | 4/1992 | Elliott | B29C 35/04 156/220 |
| 5,134,014 | A * | 7/1992 | Zaima | B32B 29/08 428/186 |
| 5,529,479 | A * | 6/1996 | Souders | B29C 33/046 156/497 |
| 6,695,939 | B1 * | 2/2004 | Nakamura | B29C 43/203 156/222 |
| 2013/0209723 | A1 * | 8/2013 | Muller | B29C 44/06 428/86 |
| 2016/0311134 | A1 * | 10/2016 | Reuber | B29C 44/445 |
| 2016/0347264 | A1 * | 12/2016 | Grande Collado | B60R 13/0218 |

FOREIGN PATENT DOCUMENTS

| | | | | |
|---|---|---|---|---|
| WO | WO-2012031190 | A1 * | 3/2012 | ............ B29C 33/68 |
| WO | 2013/111862 | A1 | 8/2013 | |

* cited by examiner a), b)

c)

d)

MANUFACTURING PROCEDURE FOR CEILING TRIMS FOR VEHICLES

The present application claims foreign priority 35 U.S.C. 119 to European Patent Office Application No. EP 16382215 filed May 17, 2016, the content of which is incorporated by reference herein in its entirety.

TECHNICAL FIELD OF THE INVENTION

This invention relates to a manufacturing procedure for ceiling trims for vehicles. The ceiling trims comprise at least one first sheet and at least one second sheet of coating that extends along the length of one of the sides that form the first sheet, joined via a layer of heat-stable polyurethane adhesive, which does not use demoulding elements in order to facilitate the extraction of the ceiling trim formed from inside of the mould.

BACKGROUND OF THE INVENTION

Conventional manufacturing procedures for ceiling trims comprising heat-stable adhesives as part of the structure consist in heat forming in a hot thermoforming mould that is necessary to cure the heat-stable adhesive by the combined action of temperature and pressure.

Said curing consists in an irreversible chemical reaction by which the adhesive hardens, producing a structure of polymer chains that cross link to form a three dimensional network.

In order for said chemical reaction to occur it is necessary to activate the adhesive. The heat provided by the mould during thermoforming once the adhesive has been activated, causes the curing reaction of the adhesive until it hardens, thus giving the ceiling its final shape.

In the particular case of heat-stable polyurethane adhesives water is usually used as an activating element, and it is normally applied on the adhesive before introducing the different layers that will form the ceiling trim inside the hot thermoforming mould.

Afterwards, during the thermoforming step, the combined application of pressure and temperature provided by the mould result in the curing of the heat-stable polyurethane adhesive by contact with the layers that form the ceiling trim with the surfaces of the hot mould.

During this step, the adhesive tends to move towards the surfaces of the hot mould until it reaches them, crossing through the layers that are contiguous to the surfaces of said mould due to the effect of the pressure exerted by the mould, which results in its adhesion to them once the adhesive has cured due to the heat provided through the surfaces of the hot mould.

Said adhesion on the one hand makes demoulding the trim more difficult during extraction, which can also result in defects in the appearance of the trim, and on the other hand it stains the thermoforming mould.

In order to prevent this problem, the use of demoulding agents is known, which act as a barrier between the adhesive that forms part of the layers of the trim and the surfaces of the mould.

These may consist, for example, in liquids demoulding agents that are applied by spraying over the mould surface, or they may be demoulding agents in the form of sheets that are sandwiched between the layers that will make up the trim and the surface of the mould, and which are removed once the trim has been thermoformed and can be reused for a new cycle.

Patent WO2012031190 shows an example that describes a manufacturing procedure for a ceiling trim that uses a demoulding sheet that prevents the adhesive from sticking to the mould surfaces.

However, the use of demoulding sheets mandates the addition of an extra component, which is especially expensive in fast manufacturing processes.

Furthermore, both the liquid demoulding agents applied on the mould surfaces and the reusable demoulding sheets produce stains on the decorative coating that makes up the visible side of the ceiling trim as a result of the degradation of said demoulding agents over time.

On the other hand, the degradation of said demoulding agents also results in the deforming of the ceiling trim during its extraction from the mould, since it is adhered to the surface of the mould in areas where the demoulding agents are not acting due to their degradation.

In view of the above, the object of the invention consists in a manufacturing procedure for ceiling trims for vehicles comprising at least a first coating sheet and at least a second coating sheet that extend along one of the sides forming the first sheet, joined via a heat-stable polyurethane adhesive layer wherein no additional demoulding agents are used to facilitate extraction of the ceiling trim formed within the mould, while at the same time maintaining a good appearance of the ceiling trim obtained.

DESCRIPTION OF THE INVENTION

The present invention is established and characterised in the independent claims, while the dependent claims describe additional characteristics thereof.

The use of a gas-phase catalyst inside the mould and particularly the beginning of its application before the thermoforming mould is completely closed, allows establishing a barrier between the adhesive and the mould surfaces due to the pressure exerted by said gas-phase catalyst on the layers that make up the trim, preventing said adhesive from penetrating the coating layer and reaching the thermoforming mould surfaces once such mould is completely closed.

Moreover, another effect of applying the gas-phase catalyst is the curing of at least one part of the adhesive forming the first heat-stable polyurethane adhesive layer, which is closest to the surface of the mould through which the gas-phase catalyst is applied.

Said part of the already cured heat-stable adhesive layer acts as a barrier, stopping the remaining adhesive forming said layer, such that once the thermoforming mould has been completely closed there is no passage of adhesive through the second coating layer, and therefore there is no contact between the adhesive and the surface of the mould.

Therefore, the extraction of the piece once the manufacturing procedure is completed is performed without difficulty and without the risk of marks caused by penetration of the adhesive to the mould or deformations resulting from adhesion of the piece to the surface of the mould.

On the other hand, the previous step of opening the mould before the adhesive is cured allows evacuating the excess of gas-phase catalyst present inside the mould, thus preventing the presence of moisture in the ceiling trim.

DESCRIPTION OF THE FIGURES

This specification is supplemented with a set of figures illustrating the preferred embodiment, which are never intended to limit the invention.

DETAILED DESCRIPTION OF THE INVENTION

Figure 1A:
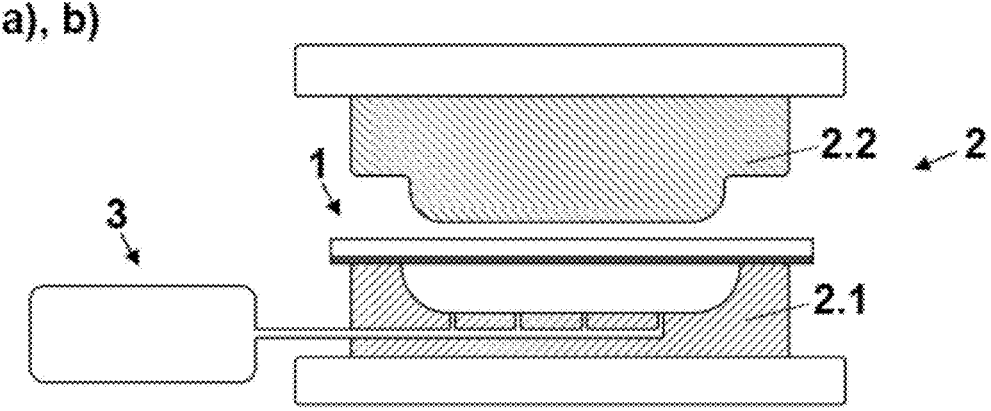
FIG. 1A shows a schematic view of steps a), b), c) and d) of the manufacturing procedure for the ceiling trim.
Figure 1A:
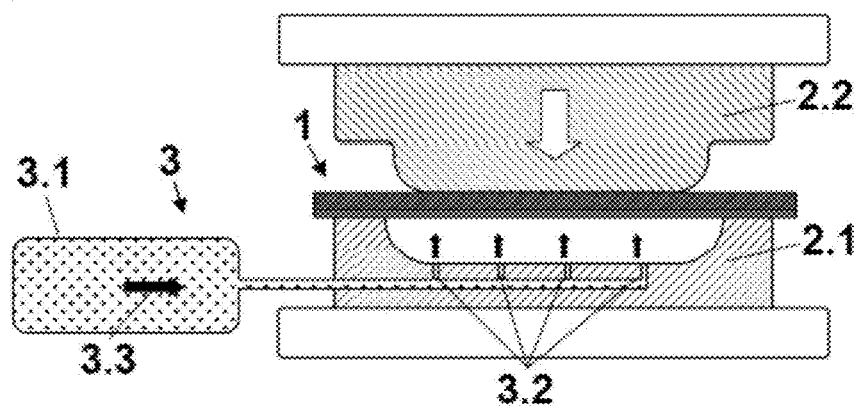
Figure 1A:
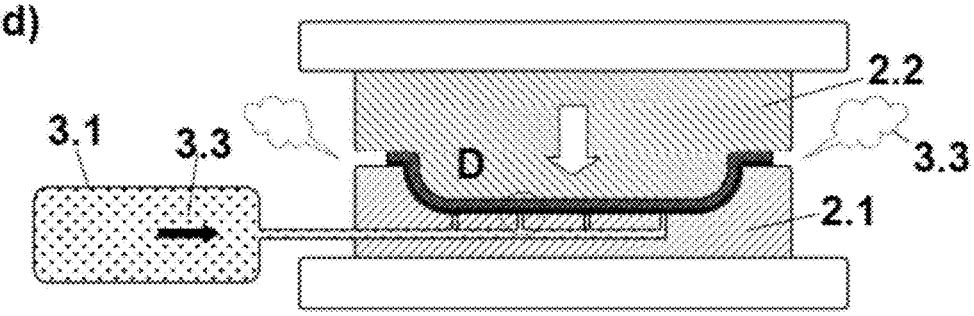
Figure 1B:
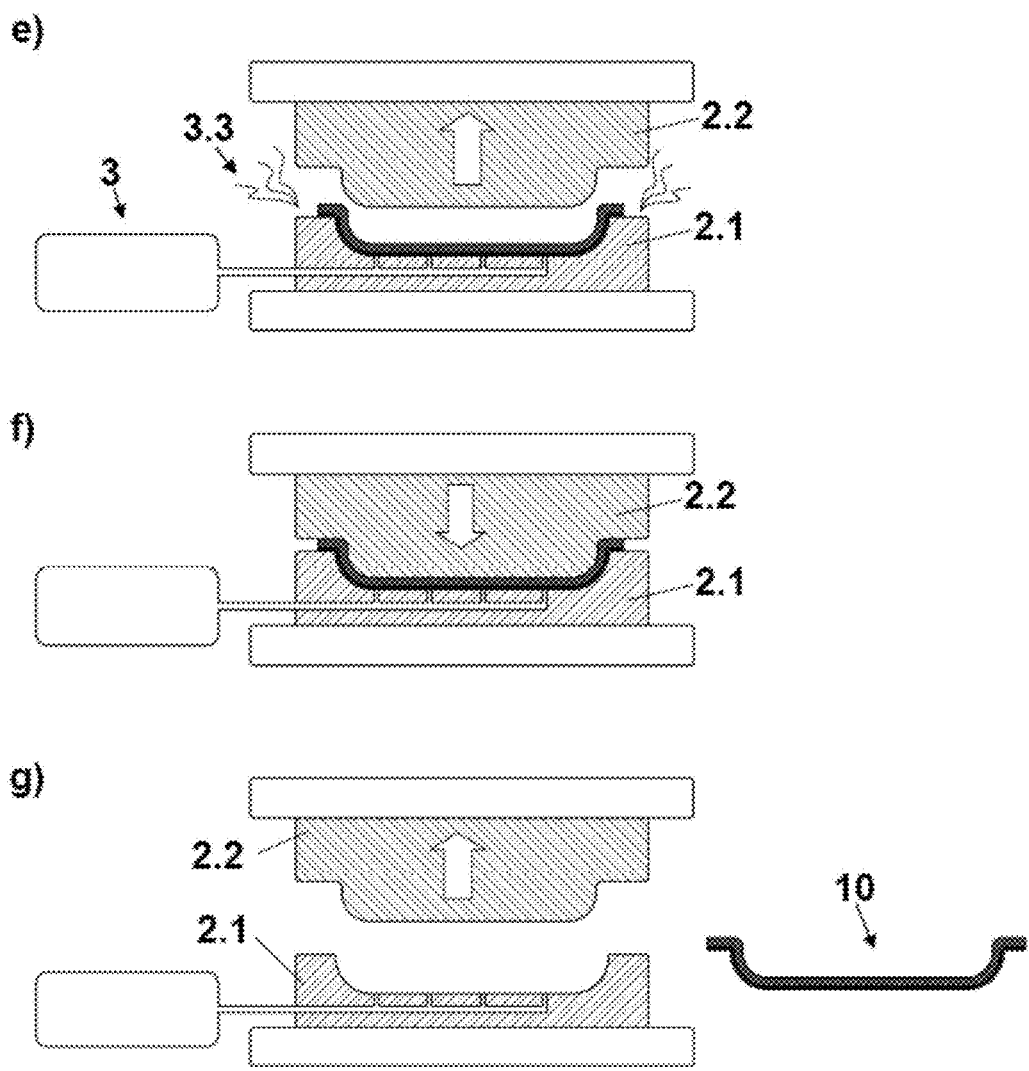
FIG. 1B shows a schematic view of steps e), f) and g) of the manufacturing procedure for the ceiling trim.

We shall now detail the sequence of steps shown in FIGS. 1A and 1B.

The first step, step a) comprises arranging a layer "sandwich" (1) formed by at least one first sheet (1.1) a second coating sheet (1.2) that covers one of the sides of the first sheet (1.1) and a first layer of unactivated heat-stable polyurethane adhesive (1.3) between said at least first sheet (1.1) and said second coating sheet (1.2) in order to join them.

The term "unactivated" relates to a state of the heat-stable polyurethane adhesive in which the chemical reaction, which results in its curing in a reasonable time corresponding to the usual time cycles in a ceiling trim manufacturing procedure, cannot occur.

In the particular case of heat-stable polyurethane adhesives contemplated by the invention, it refers to an adhesive to which the corresponding catalyst has not been added, which is a necessary component in order to produce its activation, in a previous step to step b) of introducing the layered sandwich (1) inside the mould (2).

The following step of the procedure, step b) comprises introducing the sandwich (1) inside a hot thermoforming mould (2) comprising a first half of the mould (2.1) and a second half of the mould (2.2), the temperature of which lies in the range between 100 and 150° C.

In order to perform the opening and closing movements of said mould (2), at least one of the halves of the mould (2.1, 2.2) can move between a first position in which the halves (2.1, 2.2) of the mould (2) are at a maximum separation, the mould (2) thus being completely open, and a second position in which the mould (2) is completely closed.

Thus, when the halves (2.1, 2.2) of the mould (2) reach said first position the step of opening the mould (2) would be complete, and when the halves (2.1, 2.2) of the mould (2) reach the second position the step of closing the mould (2) would be completed.

Once the sandwich (1) in introduced inside a mould (2), step c) of the procedure is carried out, which comprises the application of a gas-phase catalyst (3.3).

Said gas-phase catalyst (3.3) may be for example, steam, DABCO® (trademark of Air Products & Chemicals), diluted in water as a gas phase, an organometallic compound such as DBTL (dibutyl tin dilaurate) diluted in water as a gas phase or a diluted in water as a gas phase.

The beginning of this step c) is performed before the completion of step d), which comprises the closing of the mould (2), and the end of step c) is performed before the completion of step e), comprising the opening of the mould (2) to evacuate any excess moisture.

We must take into account that step d) of closing the mould (2) starts with the beginning of the movement of bringing the two halves (2.1, 2.2) of the mould (2) together and ends when said movement stops, resulting in the closing of the mould (2); and step e) of opening the mould (2) starts when the movement of separating the two halves (2.1, 2.2) of the mould (2) starts and ends when said movement stops, resulting in a completely open mould (2).

Therefore, the beginning of the application of the gas-phase catalyst can be performed:

before the start of step d) of closing the mould (2), that is, before the start of the movement of bringing the halves (2.1, 2.2) of the mould (2) together to produce the closing of the mould (2), after having started step d) of closing the mould (2), that is, before the start of the movement of bringing the halves (2.1, 2.2) of the mould (2) together to produce the closing of the mould (2), or simultaneously at the beginning of step d) of closing the mould (2), that is, when initiating the movement of bringing together the halves (2.1, 2.2) of the mould (2) to produce the closing of the mould (2).

Regarding the end of the application of the gas-phase catalyst (3.3), this can be performed:

before the end of step d) of closing the mould (2), that is, during the movement of bringing the halves (2.1, 2.2) of the mould (2) together to produce the closing of the mould (2), after the end of step d) of closing the mould (2), that is, once the movement of bringing the halves (2.1, 2.2) of the mould (2) together to produce the closing of the mould (2) is completed, after the start of step e) of opening the mould (2) to evacuate any excess moisture, that is, during the movement of separating the two halves (2.1, 2.2) of the mould (2) to produce the opening of the mould (2), or simultaneously to any of the last two options, that is, either at the end of the movement of bringing together the two halves (2.1, 2.2) of the mould (2) which produces the closing of the mould (2), or at the beginning of the movement of separating the two halves (2.1, 2.2) of the mould (2) that causes the opening of the mould.

In order to carry out the application of the gas-phase catalyst (3.3), the mould (2) comprises means (3) for applying the gas-phase catalyst that in turn comprise means (3.1) for generating the gas-phase catalyst (3.3), and conducts (3.2) provided therein that allow transporting the gas-phase catalyst (3.3) from the means (3.1) for generating the gas-phase catalyst to the interior of the mould (2).

The application of the gas-phase catalyst (3.3) is performed through the first half of the mould (2.1) that is in contact with the second coating sheet (1.2).

Figure 3:
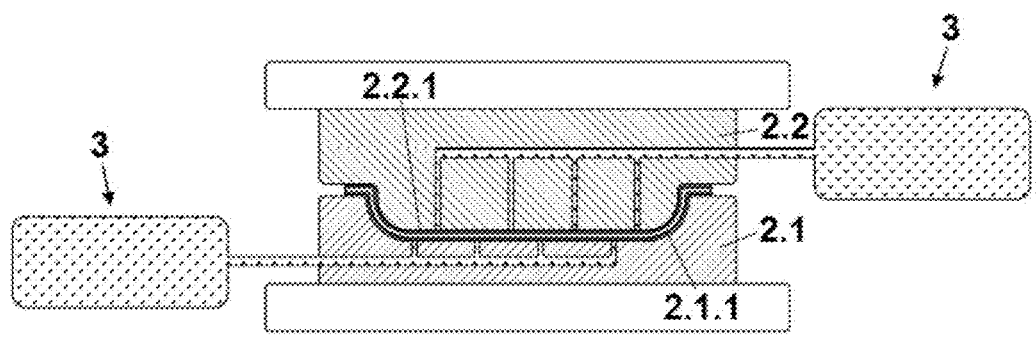
FIG. 3 shows a schematic view of the mould according to a variant of the invention wherein both the first half of the mould and the second half of the mould comprise means for applying the gas-phase catalyst.

According to a variant of the invention, as shown in FIG. 3, the application of the gas-phase catalyst (3.3) may also be performed through the second half of the mould (2.2) on a third coating sheet (1.4) that can form part of the sandwich structure (1).

The application of the gas-phase catalyst (3.3) on the sandwich (1) results in the activation of the adhesive forming part of the first heat-stable polyurethane adhesive layer (1.3) as a result of the effect of the gas-phase catalyst (3.3).

Moreover, said application of the gas-phase catalyst (3.3) is performed with sufficient pressure to allow said gas-phase catalyst (3.3) to access the entire heat-stable polyurethane adhesive and thus allow its activation. Said pressure is greater than the atmospheric pressure and particularly 2 bars, and in a specific case it is in a range between 2 and 15 bar.

Moreover, the application of the gas-phase catalyst (3.3) results in the creation of a barrier between the first heat-stable polyurethane adhesive layer (1.3) and the surface (2.1.1) forming the first half of the mould (2) as a result of the pressure exerted by the gas-phase catalyst (3.3) on the first layer of heat-stable polyurethane adhesive (1.3).

Figure 2:
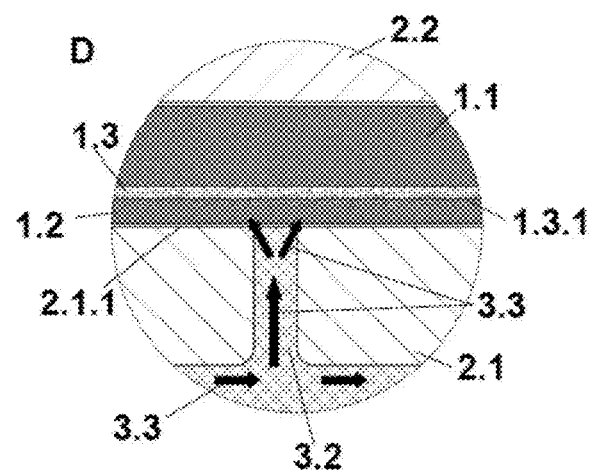
FIG. 2 shows a view of a detail D shown in FIG. 1A that shows the progress of the gas-phase catalyst towards the heat-stable polyurethane adhesive layer.

Finally, and as shown in detail D represented in FIG. 2, once the adhesive contained in the first layer of heat-stable polyurethane adhesive (1.3) has been activated, part (1.3.1) of the first layer of heat-stable polyurethane adhesive (1.3) that is in contact with the second coating sheet (1.2) is cured, preventing the adhesive forming said layer (1.3) from passing through to the second coating sheet (1.2), and therefore preventing contact of said adhesive with the surface (2.1.1) of the first half of the mould (2.1).

In the variant shown in FIG. 3, all these effects produced by applying the gas-phase catalyst through the first half of the mould (2.1) are also produced on a second layer of heat-stable polyurethane adhesive (1.5) that is in contact with a third coating sheet (1.4) which is in contact with the surface (2.2.1) of the second half of the mould (2.2).

This variant therefore contemplates a sandwich the structure of which also consists of a third coating sheet (1.4) joined to the other side of the first sheet (1.1) via a second heat-stable polyurethane adhesive layer (1.5), as shown in the examples represented in FIGS. 5B and 5C and described in detail below.

Step d) is then performed, comprising the closing of the thermoforming mould (2) and thus the application of pressure on the sandwich (1). This step d), once step c) is started, is performed by maintaining the introduction of the gas-phase catalyst (3.3) at a pressure of more than 2 bar through the first half of the mould (2.1) and maintaining the circulation of the gas-phase catalyst (3.3) through the sandwich (1).

Said pressure of the gas-phase catalyst (3.3) results in the discharge thereof from inside the mould (2) as shown in FIG. 1A.

Due to the barrier formed by the curing of a part (1.3.1) of the adhesive corresponding to the heat-stable polyurethane adhesive layer (1.3), said adhesive cannot pass through the second coating sheet (1.2) and therefore cannot reach the surface (2.1.1) corresponding to the first half of the mould (2.1).

After step d) comes step e), comprising the opening of the mould (2) to evacuate any excess moisture from the sandwich (1) as excess gas in order to prevent the occurrence of moisture in the sandwich (1) as a result of the excess of gas-phase catalyst (3.3) applied thereto.

Step f) is then performed, comprising closing the mould (2) to complete the curing of the first heat-stable polyurethane adhesive layer (1.3), or of said first heat-stable polyurethane adhesive layer (1.3) and the second heat-stable polyurethane adhesive layer (1.5) according to the variant contemplated in FIG. 3.

Finally, in order to complete the procedure we have step g), comprising the opening of the mould (2) and the extraction of the ceiling trim (10) with its final shape and all of the cured adhesive.

Figure 4A:
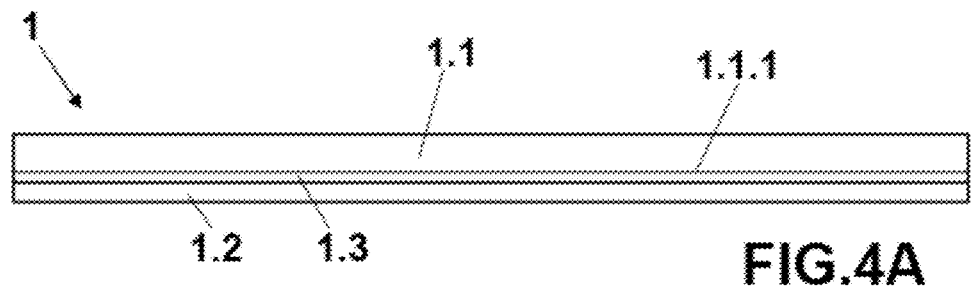
FIGS. 4A, 4B and 4C show three "sandwich" layering examples according to the invention.
Figure 4B:
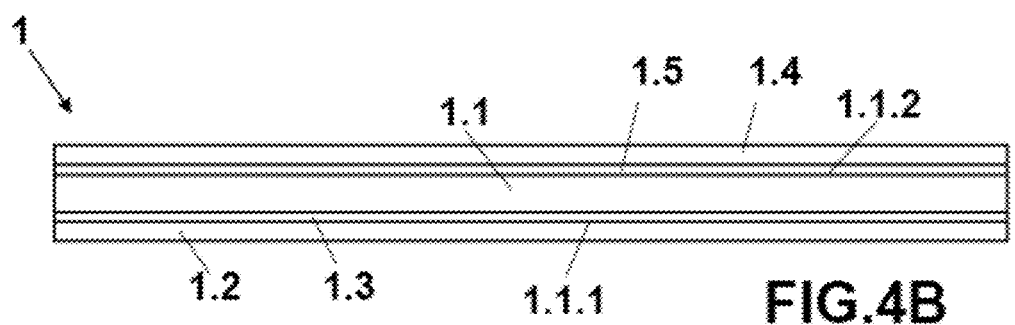
Figure 4C:
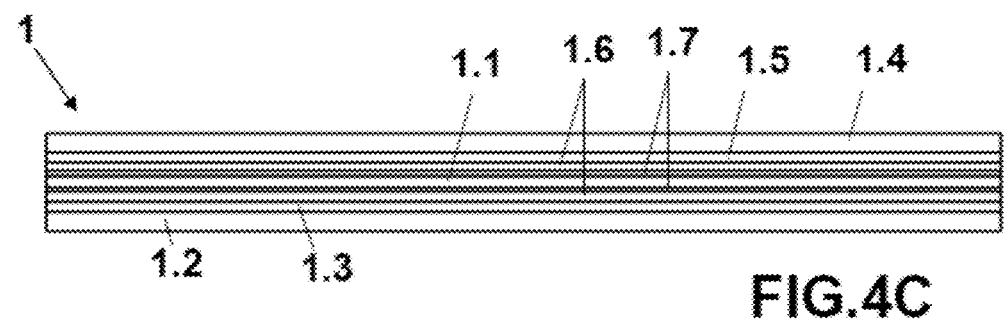

Regarding the configuration of the structure of sheets and layers making up the sandwich (1), FIGS. 4A, 4B and 4C show three possible embodiments according to the invention.

The first of these represented in FIG. 4A shows a structure formed by a first coating sheet (1.1) and a second coating sheet (1.3) covering one of the sides (1.1.1) of the first sheet (1.1) and a first layer of inactivated heat-stable polyurethane adhesive (1.3).

The first sheet (1.1), as shown in the example represented in FIG. 4C, can also be part of an assembly consisting of several superimposed sheets (1.1, 1.6, 1.7). Particularly, the first sheet (1.1) may comprise a foam sheet, coated on both sides with a sheet of reinforcing fibres (1.6) joined to said foam sheet via a layer of adhesive (1.7).

The second coating sheet (1.2) may comprise a non-decorative coating or a decorative coating.

The sandwich may also comprise, as shown in FIG. 4B, a third decorative or non-decorative coating sheet (1.4) that covers the other side (1.1.2) of the first sheet (1.1) and a second layer of heat-stable polyurethane adhesive (1.5) between them to join them together.

The invention claimed is:

1. A manufacturing procedure for ceiling trims for vehicles comprising the following steps:
   a) arranging a layer "sandwich" formed by at least one first sheet, a second coating sheet that covers one side of the first sheet, and a first layer of unactivated heat-stable polyurethane adhesive between said at least first sheet and said second coating sheet in order to join them;
   b) introducing said sandwich inside a hot thermoforming mould comprising a first half of the thermoforming mould and a second half of the thermoforming mould, the temperature of said hot thermoforming mould lies in a range between 100 and 150° C.;
   c) applying a gas-phase catalyst with a pressure of more than 2 bar on the sandwich through the first half of the thermoforming mould that is in contact with the second coating sheet, thereby forming a barrier layer in the first layer of unactivated heat-stable polyurethane adhesive, cured by the application of the gas-phase catalyst;
   d) closing the thermoforming mould and applying pressure on the sandwich while the sandwich is within the thermoforming mould and maintaining the gas-phase catalyst at a pressure of more than 2 bar through the first half of the thermoforming mould and maintaining a circulation of the gas-phase catalyst through the sandwich;
   e) opening the thermoforming mould for an evacuation of excess moisture in the sandwich as excess gas-phase catalyst in order to prevent the occurrence of moisture in the sandwich as a result of the excess of gas-phase catalyst applied thereto;
   f) after the excess gas-phase catalyst is evacuated from the thermoforming mould, closing the thermoforming mould to complete the curing of the first layer of heat-stable polyurethane adhesive; and
   g) opening the thermoforming mould and extracting the sandwich forming a ceiling trim;
   wherein Step c) is started before the end of Step d);
   wherein Step c) ends before the end of Step e).

2. A manufacturing procedure for ceiling trims for vehicles according to claim 1, wherein the second coating sheet is a non-decorative or a decorative coating sheet.

3. A manufacturing procedure for ceiling trims for vehicles according to claim 1, wherein the sandwich comprises a third decorative or non-decorative coating sheet that covers the other side of the first sheet and a second layer of heat-stable polyurethane adhesive between them to join them together.

4. A manufacturing procedure for ceiling trims for vehicles according to claim 3, wherein the application of the gas-phase catalyst is also performed through the second half of the thermoforming mould in contact with the third decorative or non-decorative coating sheet.

5. A manufacturing procedure for ceiling trims for vehicles according to claim 1, wherein the first sheet is part of an assembly formed by several superimposed sheets.

6. A manufacturing procedure for ceiling trims for vehicles according to claim 1, wherein the pressure of the gas-phase catalyst in steps c) and d) is equal to or less than 15 bar.

* * * * *